United States Patent [19]

Depweg et al.

[11] 4,351,096
[45] Sep. 28, 1982

[54] MULTIPLE SPINDLE ROTARY INDEXING MACHINE TOOL

[75] Inventors: Frank A. Depweg, Fairfield; Edward A. Zukowski, Milford, both of Conn.

[73] Assignee: White Consolidated Industries, Inc., Cleveland, Ohio

[21] Appl. No.: 182,212

[22] Filed: Aug. 28, 1980

[51] Int. Cl.³ .................... B23B 13/04; B23B 9/12
[52] U.S. Cl. .................... 29/38 A; 82/2 B; 82/2 D
[58] Field of Search ............ 29/38 A, 38 B; 82/2 B, 82/2 D, 3

[56] References Cited

U.S. PATENT DOCUMENTS

| | | | |
|---|---|---|---|
| 2,947,188 | 8/1960 | Bullard et al. | 74/333 |
| 3,292,466 | 12/1966 | Jacoby | 82/3 X |
| 3,792,633 | 2/1974 | Filipiev et al. | 29/38 AX |
| 3,854,353 | 12/1974 | Cutler | 82/2 BX |
| 4,159,660 | 7/1979 | Buckley et al. | 82/3 |
| 4,255,991 | 3/1981 | Lambert | 82/2 BX |

*Primary Examiner*—Z. R. Bilinsky
*Attorney, Agent, or Firm*—Mandeville and Schweitzer

[57] ABSTRACT

The disclosure relates to an improvement in multiple spindle, single drive, rotary indexing machine tool systems. The basic machine comprises a fixed circular base and a central, upwardly projecting column. An indexing circular worktable is mounted on the base, for incremental, rotary indexing movements about the central column. The worktable carries a number of rotatable, work-holding chucks or spindles, which are progressively indexable with the worktable from a loading station progressively through a series of rotationally displaced work positions. Pursuant to the invention, one of the work stations is arranged to be mechanically independent of the primary machine drive and is provided with a tool slide with independent, numerically controlled motors for X and Y axis tool movement, and a third independent motor for spindle rotation. The three motors at the final work station are coordinated by a computerized numerical control system, in itself of a known design, so that the final finish machining step may include a variety of operations not otherwise possible, such as complex contouring, threading, and the like. Additionally, the CNC controlled machining operations may be carried out in a manner to override the machining tolerance limitations which are otherwise inherent in the basic nature of the multiple spindle, rotary indexing type machine tool system.

5 Claims, 8 Drawing Figures

MULTIPLE SPINDLE ROTARY INDEXING MACHINE TOOL

RELATED CASES

The subject matter of this application is related to that of the E.C. Bullard et al. U.S. Pat. No. 2,947,188, which is incorporated herein by reference.

BACKGROUND AND SUMMARY OF THE INVENTION

Multiple spindle, rotary indexing machine tool equipment, particularly of the type described in the Bullard et al. U.S. Pat. No. 2,947,188 has enjoyed a high degree of acceptance in the industry over a long period of years. The equipment is well suited to the repetitive, mass production of rotary machined parts, where the need is to produce extended high production runs of identical parts. In the automotive industry in particular, the equipment referred to above, commercially known as the Bullard "Mult-Au-Matic" Vertical Chucking Machine, has enjoyed a great deal of success.

Notwithstanding its many and important advantages, multiple spindle rotary indexing machine tool equipment of known design has had certain limitations in its capabilities, relating particularly to the degree of precision obtainable, and to the types of machining operations capable of being carried out. Accordingly, it is a primary objective of the present invention to provide a practical modification to the "Mult-Au-Matic" type multiple spindle rotary indexing machine tool, which retains its significant advantages, yet which at the same time enables the finished part to be delivered machined to higher orders of accuracy than heretofore possible and in finished forms heretofore impossible or impracticable to achieve.

In multiple spindle indexing machines of the type described in the before mentioned Bullard et al. U.S. Pat. No. 2,947,188, the machine includes a fixed circular base provided with a vertically upstanding central column. A circular worktable is rotatably supported on the base and carries a plurality of rotary spindles. For example, the circular worktable may have six equally spaced work stations, each containing a pair of work-holding spindles. The circular worktable is incrementally indexable about the central column, so that the individual sections are progressively indexed into different machining positons. Desirably, in a machine having six work stations on the worktable, there are five machining positions spaced about the central column, and a sixth position used for unloading of the finished work and loading of new rough pieces onto the spindles.

At the top of the vertical column, there is mounted a single drive motor, which operates all of the basic functions of the conventional equipment, including rotation of the spindles, indexing of the worktable and feeding of cutting tools. Each of the machining stations of the column has associated with it, mounted on the platform above, a mechanical feed works, driven from the primary motor and arranged with various change gears for controlling spindle rotational speed and tool feed rates at that machining station.

After rough parts are mounted on the spindles at the loading station, the table indexes progressively around the column. At each machining station, a particular machining operation is performed, and the spindle speeds and tool feed rates at that station are appropriately set to the operations performed. After a given operation is completed, and the tools are retracted, the table automatically indexes one position, and different machining operations are performed at the next machining station. When the equipment is operating on a steady state basis, the finished parts are successively indexed into the load-unload position, where they are removed and replaced by new rough parts. The parts then progress step by step around the central column, being machined in a particular manner at each of the five machining stations.

Because of the basic nature of the equipment, in which each of several worktable positions are successively associated with each of several different machining stations, there are inherent limitations to the ultimate accuracy achievable. In general, as a practical matter, tolerance of about 0.0005 inch are about as low as can be consistently maintained. Likewise, the arrangement of the feed works is such that contour machining and/or threading operations, for example, are not practical.

In accordance with the present invention, a multiple spindle rotary indexing machine tool is provided which, while retaining the basic functions and advantages of the known and tested equipment, renders such equipment greatly more versatile by enabling threading and contouring operations to be carried out and, in addition, enabling machining operations to be carried out to significantly greater levels of accuracy, for example, to tolerances of 0.0001 inch. In general, this is accomplished by modifying the equipment at one or more (but less than all) of the machining positions, typically the one prior to the load-unload positions, such that all functions, both tool advance and spindle rotation, are performed independently of the primary machine drive and under the control of a computerized numerical control system. With this arrangement, not only as it possible to perform complex contouring and threading operations at the modified machining stage, but further, the minor dimensional variations in the equipment, from one index position to another, may be readily compensated for, in order to provide increased levels of machining accuracy.

For a better understanding of the above and other features and advantages of the invention, reference should be made to the following detailed description of a preferred embodiment and to the accompanying drawings.

DESCRIPTION OF A PREFERRED EMBODIMENT

Figure 1:
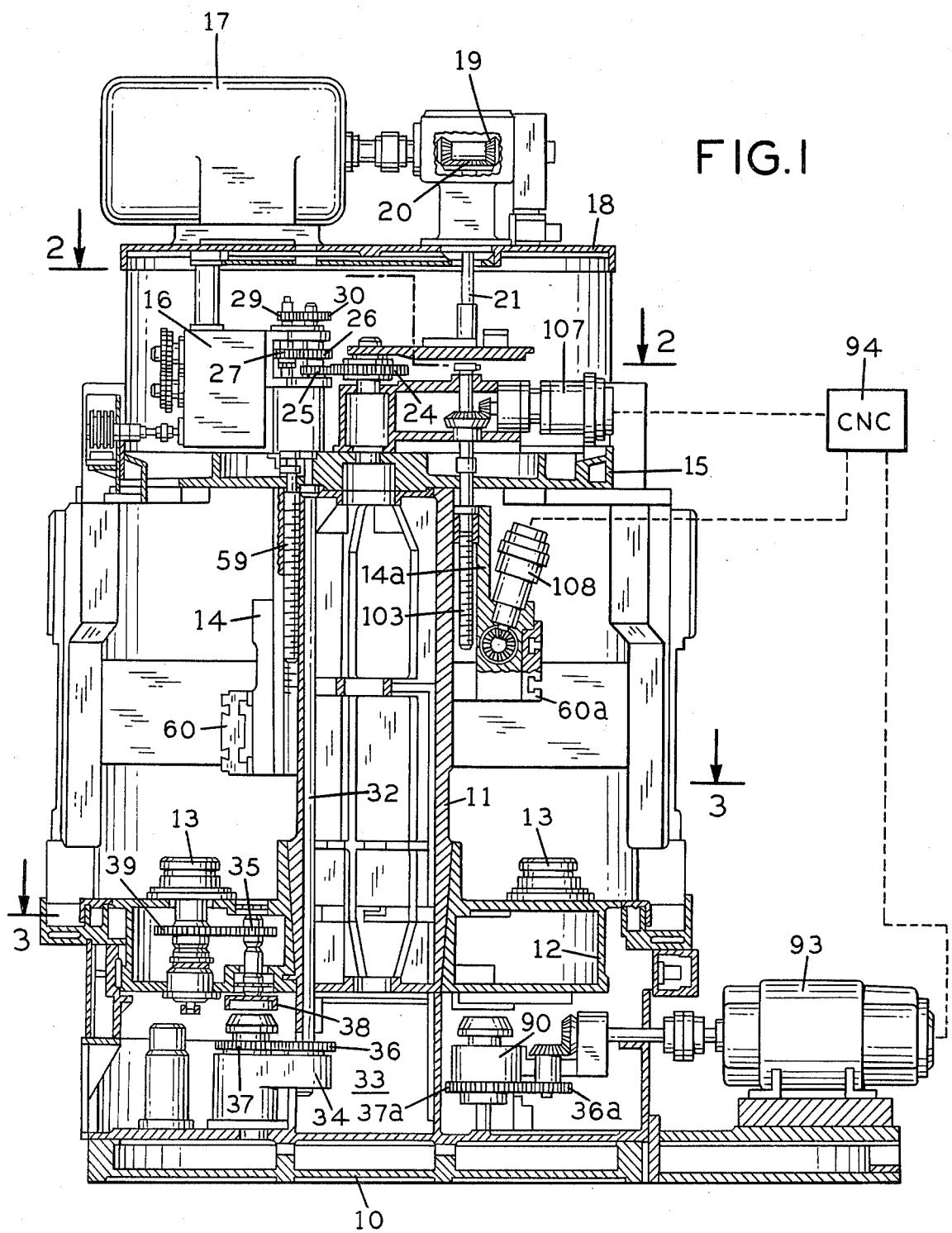
FIG. 1 is a longitudinal cross sectional view of a multiple spindle, rotary indexing machine tool incorporating the principles of the invention, the section being taken generally along line 1—1 of FIG. 2.

Referring now to the drawings, the reference numeral 10 designates generally a fixed circular machine base on which is rigidly mounted an upstanding vertical column 11. The machine base rotatably supports a worktable 12 carrying a plurality of work-holding spindles 13. In general, the construction of the machine shown in the drawings is more or less in accordance with that of the E. C. Bullard et al. U.S. Pat. No. 2,947,188, incorporated herein by reference, to which attention is directed for more specific details of construction and operation of the equipment. Machine tool apparatus of the type herein contemplated is also made available commercially as of the filling date hereof by The Bullard Company, division of White Consolidated Industries, Inc., Bridgeport, Conn., under the trade designation "Mult-Au-Matic Type L Vertical Chucking Machine".

Figure 3:
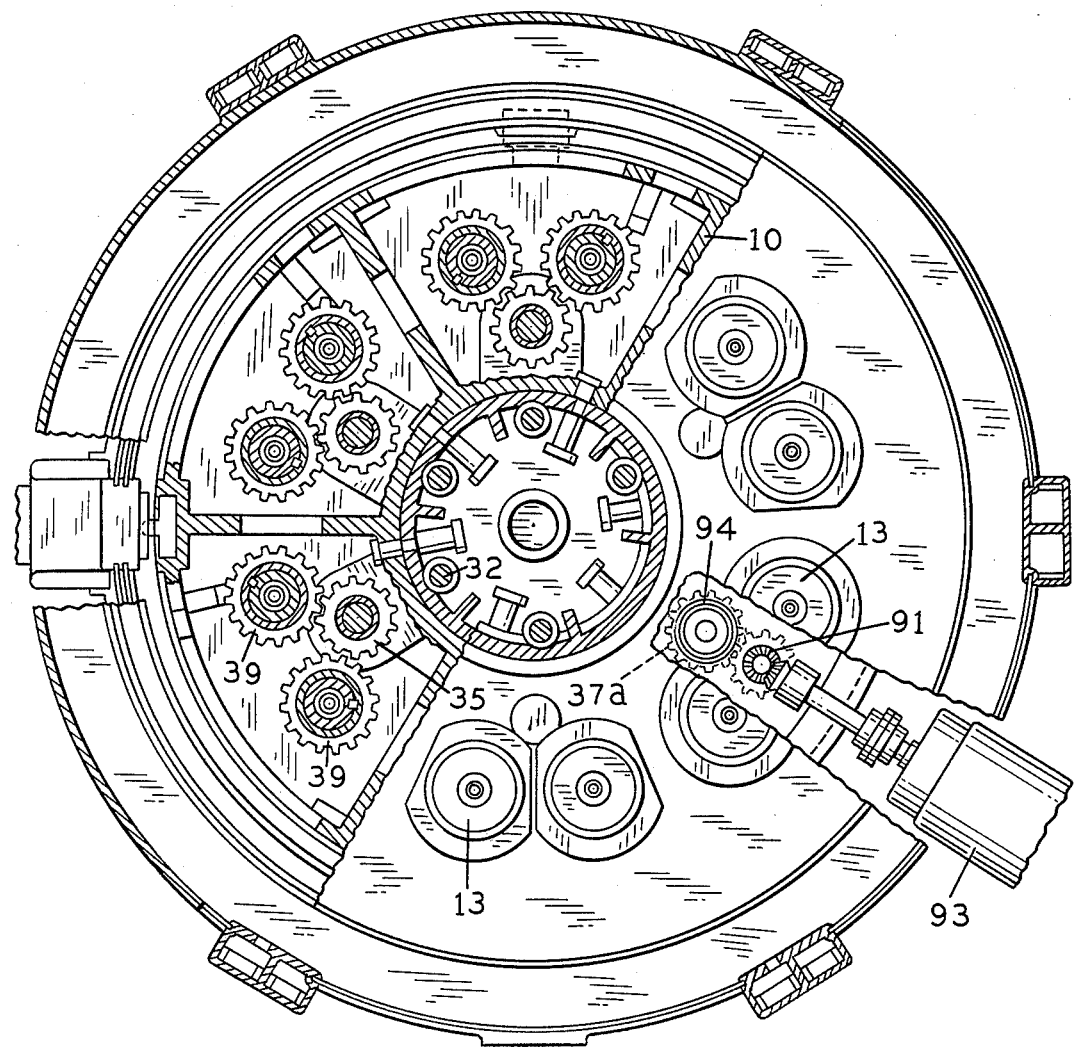

In the illustrated apparatus, the circular worktable 12 has six equally divided segments, each of which mounts a pair of work-holding spindles 13 (see FIG. 3). The worktable is annular in form and rotates about the fixed central column 11.

The central column 11 of the equipment is, like the worktable, divided into six equal segments, each constituting a work station. Five of those segments are machining stations, and are provided with tool holding sides 14, 14a (FIG. 1). The sixth position on the column is left open, and is used for loading and unloading of workpieces.

At the top of the column 11 is a feed works platform 15, on which are mounted a plurality of individual feed works mechanisms 16. In a conventional Mult-Au-Matic machine, there are five such individual feed works units 16, one for each of the tool slides 14. In the illustrated machine, however, as will be described in greater detail, the equipment only includes four feed works mechanisms, one for each of the first four tool slides 14. The fifth tool slide 14a, being the one in which the final machining operations are performed and being located immediately in advance of the load-unload station, is controlled and operated independently of the other stations.

A primary drive motor 17 is mounted on a drive platform 18, at the top of the machine and serves to provide power for all of the functions of the machine, with the exception of the last machining station.

Figure 2:
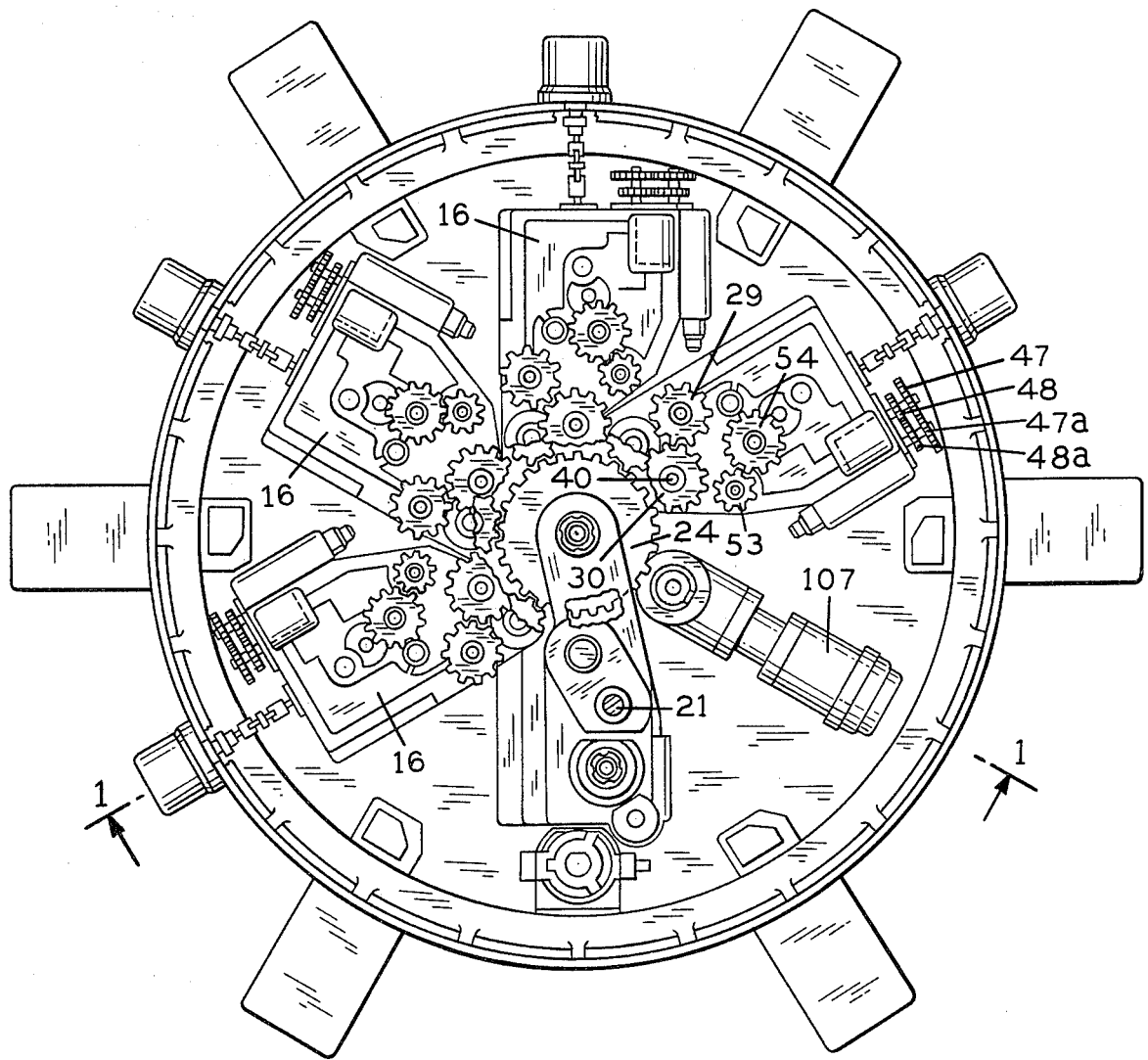
FIGS. 2 and 3 are cross sectional views as taken generally on lines 2—2, 3—3 respectively of FIG. 1.
Figure 4:
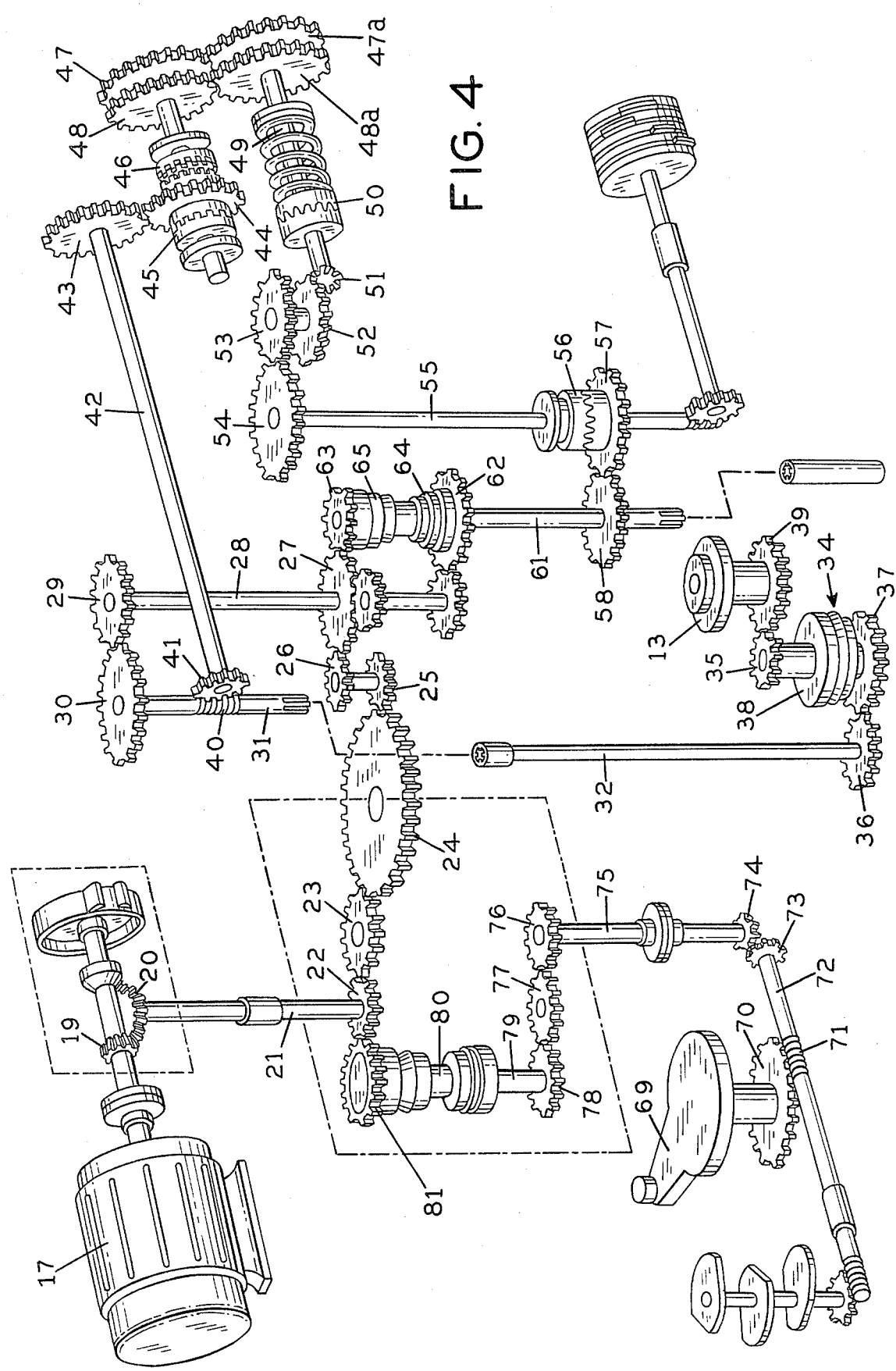
FIG. 4 is a schematic representation of the mechanical drive system utilized in the apparatus of FIG. 1.

With reference to the schematic diagram of FIG. 4, the primary drive motor 17 is coupled through bevel gears 19, 20 to a vertical drive shaft 21. The shaft 21 is, in turn, connected through a drive pinion 22 and idler gear 23 to a bull gear 24. The bull gear, as will be described, drives in common each of the four feed works units 16, which are clustered radially around the bull gear, substantially as shown in FIG. 2. Each of the feed works units includes output means for driving the spindles at that station, as well as for driving the horizontal and vertical tool slides.

With reference to FIG. 4, the gear mechanisms illustrated to the right of the bull gear 24 represent in substance the mechanisms of a single feed works unit. Thus, the bull gear 24 drives a pinion 25 which, through a pair of gears 26, 27, drives a spindle transmission shaft 28. Through a pair of removable and changeable spindle speed change gears 29, 30 and a spindle drive shaft assembly 31, 32, spindle power is transmitted from the feed works level, at the top of the machine, to the housing 33 formed in the machine base 10.

In the base housing 33, associated with each pair of spindles 13, is a synchronizer unit 34, which includes a combination friction clutch and positive drive connection for engagement with a spindle drive pinion 35. A pinion 36, at the lower end of the spindle drive shaft 32, meshes with a synchronizer gear 37, which thus rotates with the primary drive motor 17 at a speed determined by the change gears 29, 30. After an indexing operation has been completed, the synchronizer 34 is engaged with a mating synchronizer element 38, which is movable with the worktable, to drivingly engage the spindle mechanism which is then located above that particular synchronizer. The pinion 35 drives a pair of spindle gears 39 (only one being shown in FIG. 4), so that the pair of spindles 13 at a given work station are driven at the desired speed. As set forth in more detail in the before mentioned Bullard et al. U.S. Patent, during the initial engagement of the synchronizer 34, the spindles are accelerated up to speed by a friction clutch arrangement, following which the drive is mechanically, interlockingly engaged to provide a positive drive between the spindles 13 and the primary drive motor 17.

As will be understood, the synchronizer mechanisms 34 remain fixed in the base housing 33. At the end of a particular machining operation, the several synchronizers are retracted to accommodate rotary indexing of the worktable, after which the synchronizer units are extended to engage the new spindle drive. Thus, as the spindles advance around the column, they are successively engaged by different synchronizer units and driven at different speeds appropriate to the particular machining operation being performed.

Referring still to FIG. 4, the upper portion 31 of the spindle drive shaft has a worm gear portion 40 meshing with a worm wheel 41, mounted on a feed takeoff shaft 42. The shaft 42 mounts a pinion 43 meshing with a feed drive gear 44. Through clutch mechanisms 45, 46, the drive gear 44 is selectively engaged to drive either fine feed or course feed change gears 47, 48, meshing with similar change gears 47a, 48a fixed to a shaft 49. The shaft 49 drives through a safety clutch 50 (which releases at a predetermined torque) a bevel pinion 51 meshing with a corresponding bevel gear 52. The bevel gear 52 in turn drives through a gear set 53, 54, shaft 55 and clutch 56 a pair of feed gears 57, 58. The feed gear 58 drives a shaft 59 threadedly engaged with the corresponding vertical slide block 14. Thus, when the feed clutch 56 is engaged, the threaded shaft 59 is rotated, either at the fine feed rate or at the course feed rate, depending on the position of the clutches 45, 46. As explained more fully in the before mentioned Bullard et al. U.S. Pat. No. 2,947,188, both vertical and horizontal tool feed motions are derived from controlled rotation of the threaded shaft 59, through a series of mechanical interlocks which, after a predetermined degree of vertical movement of the slide, convert any further shaft rotation into horizontal translational movement of a horizontal tool slide 60.

For high speed traverse of the tool slide, a drive shaft 61, which mounts the gear 58 and connects with the threaded shaft 59, may be driven by a gear 62 (down direction) or 63 (up direction), depending upon which, if either, of clutches 64, 65 is engaged. If either of the clutches 64, 65 is engaged, the feed clutch 56 is disengaged and the threaded shaft 59 rotates at traversing speed, either in the up or down direction as the case may be. The timing of the clutches 44, 46, 56, 64 and 65 may be controlled by a cam driven 66 rotated by a worm wheel 67 connected through a worm wheel 68 to the feed drive gear 57.

Indexing of the rotary worktable 12 is effected by a Geneva-like mechanism in the form of a rotary arm 69 which, when driven through a full revolution, advances the rotary worktable 12 through one sixth of a revolution, to advance the workpieces one station. The index arm is driven by a worm wheel 70 from a worm gear 71 carried on an index drive shaft 72. Bevel gears 73, 74 connect the index drive shaft to a vertical shaft 75, which extends upward into the feed works level of the machine and there is connected through gears 76-78 with a shaft 79. The latter is connected through a brake-clutch mechanism 80, to a drive gear 81 driven directly from the transmission shaft 21 through the pinion 22. When the brake-clutch 80 is actuated for driving engagement, the indexing arm 69 is driven through a single revolution, after which the mechanism 80 is actuated to its brake position until the next indexing movement is called for.

Figure 5:
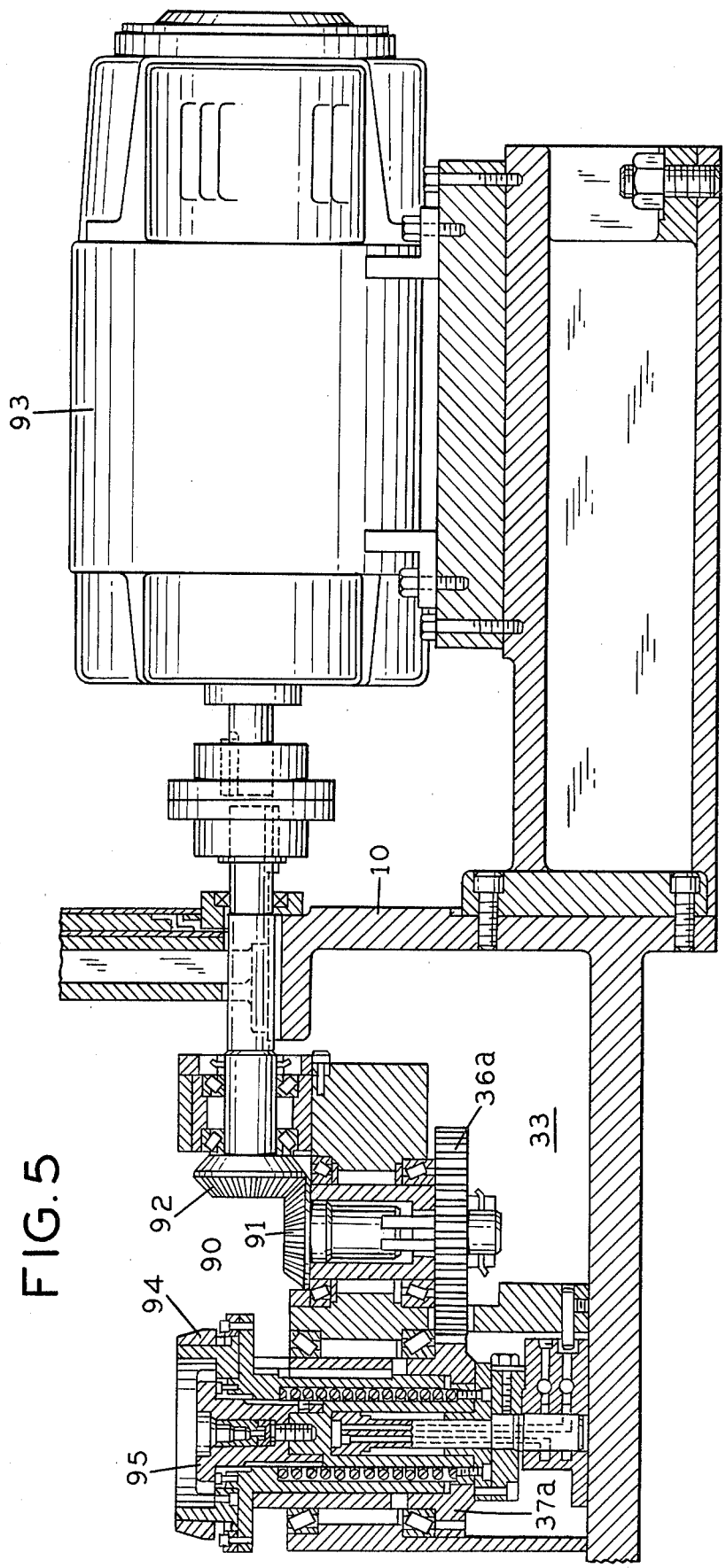
FIG. 5 is a cross sectional view of an independent spindle drive system, incorporated in the apparatus of FIG. 1, for independently controlling the spindles at the last machinining position.

In accordance with the invention, the feed works for one of the machining stations, advantageously is omitted entirely, so that neither the tool slide nor the spindles at the modified station are connected to the mechanical drive system. Instead, at the modified station, there is provided a modified form of synchronizer 90 (FIG. 5) driven by gears 36a, 37a corresponding in general to gears 36, 37 of the conventional synchronizer 34. The drive input gear 36a is connected through bevel gears 91, 92 to an independently controlled, external drive motor 93, advantageously a variable speed DC electric motor. The synchronizer 90 is in general similar to the synchronizers 34, having a friction clutch element 94 and a splined mechanically engaging element 95. As explained in more detail in the before mentioned Bullard et al. patent, when the worktable is in an indexed position, ready to start a new machining operation, the friction element 94 of the synchronizer, being driven at the desired speed, is elevated conrollably by hydraulic control means. The friction element 94 engages a corresponding element 38 connected to the spindle gear 35. The frictional relationship causes the gear 35 and the connected pair of spindles 13 to be accelerated up to the desired rotary speed, after which the splined element 95 is elevated into a fixed mechanically connected drive relationship. Thus, in the illustrated mechanism, as each machining sequence is commenced, the spindle pairs at machining stations one-four are controllably driven at fixed speeds, which may be different at each station, as a function of the speed of the primary drive motor 17 and the spindle change gear combinations 29, 30 at each station. The spindle pair at the fifth machining station, on the other hand, is driven independently, at speeds which may vary during the machining sequence, by means of the variable speed motor 93. The variable speed operation is under the control of a computerized numerical control system 94, which may in itself be of known and readily available commercial design.

In place of the standard vertical and horizontal tool slides 14, 60 of the standard machining stations, the modified machining station utilizes independently controlled vertical and horizontal slides 14a, 60a.

Figure 6:
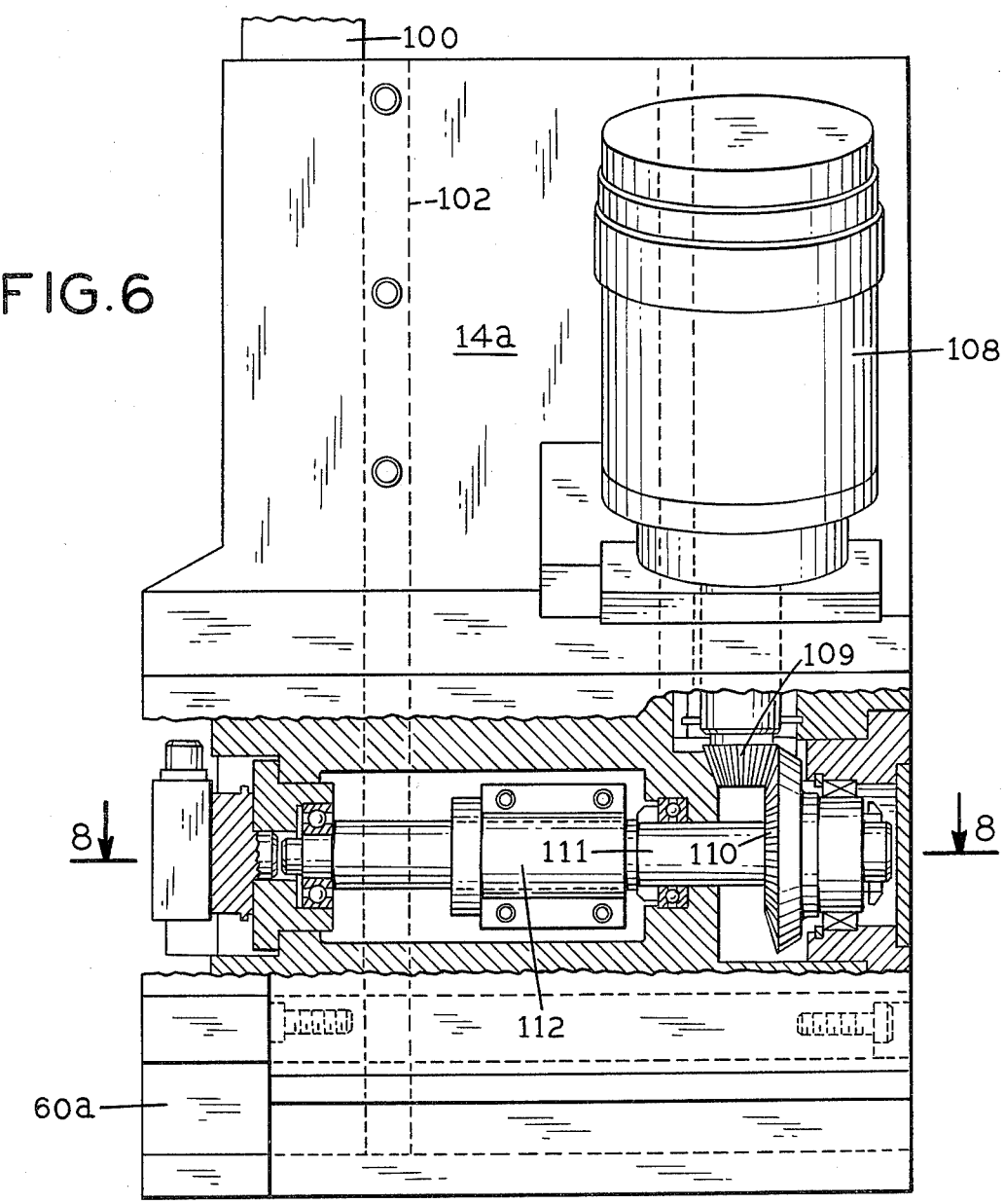
FIG. 6 is a front elevational view, partly in section, illustrating the tool slide arrangement according to the invention for use at the last machining stage.
Figure 8:
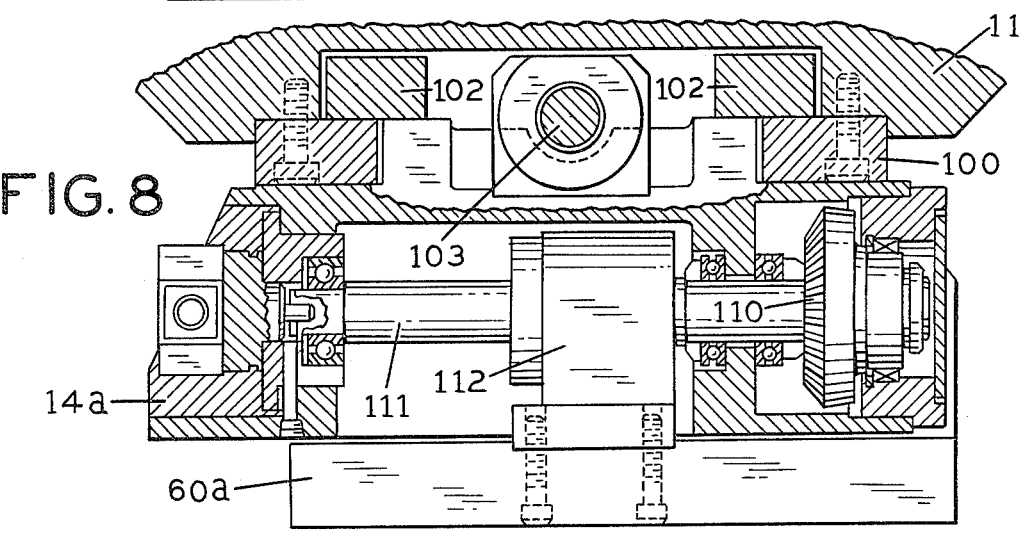
FIG. 8 is a cross sectional view taken generally on line 8—8 of FIG. 6.
Figure 7:
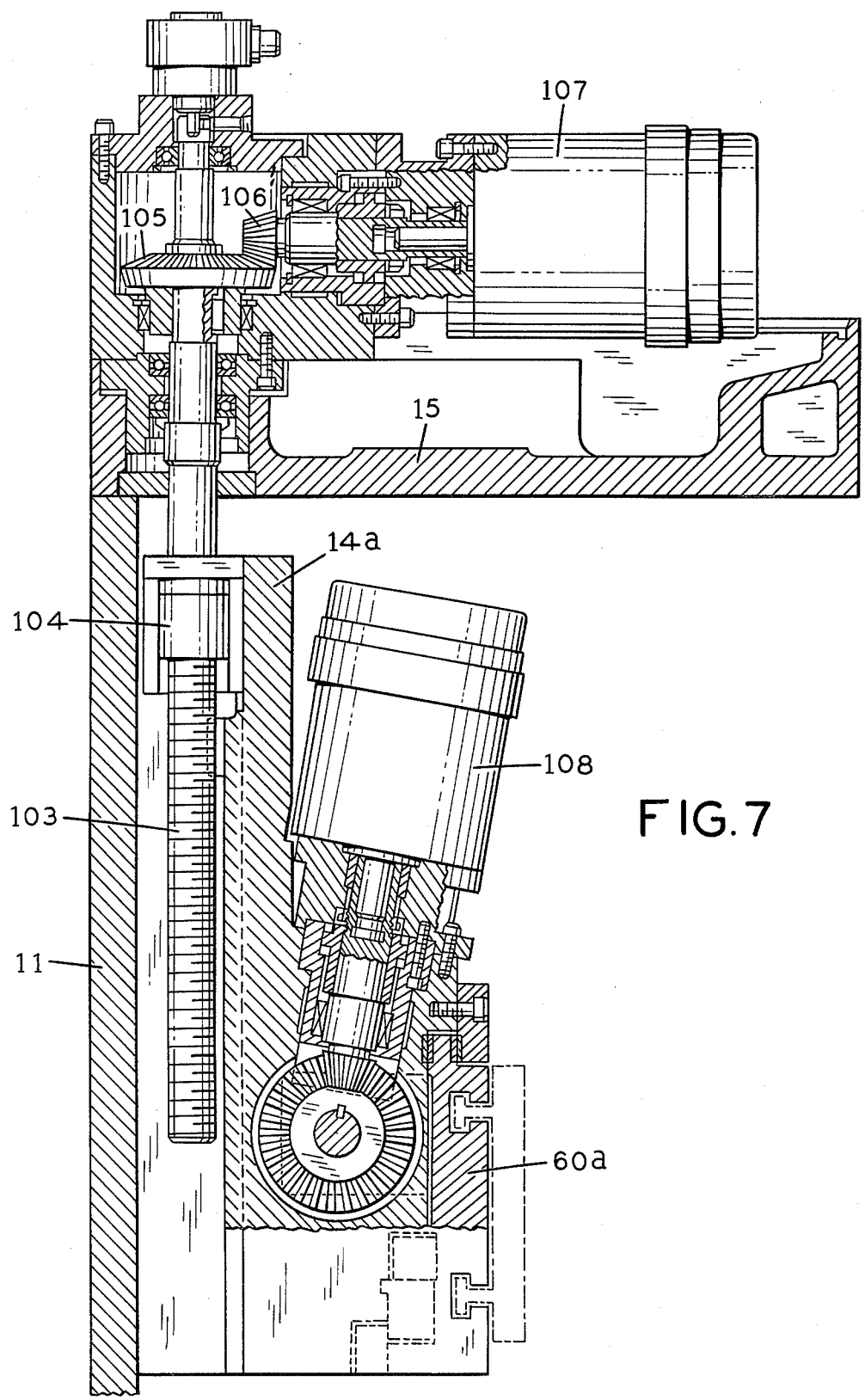
FIG. 7 is a cross sectional view, taken generally on line 7-7 of FIG. 1, illustrating the tool drive arrangement for the last machining station.

As reflected in FIGS. 6-8, the vertical slide 14a is slideably engageable with fixed vertical guide rails 100 secured to the central vertical column 11, it being understood that similar pairs of guide rails are spaced equidistantly about the column for the mounting of the tool slide at stations one-four. In a typical case, the column 11 has a recess 101 formed in its face, which receive guide bars 102 fixed to the vertical slide 14a. A threaded shaft 103, corresponding in some ways to the threaded shaft 59 of a standard machining station, is connected to the vertical slide 14a through a ball screw element 104. The shaft 103 is not, however, connected to a mechanical feed works mechanism, but instead extends upwardly through the feed works platform 15, where it is connected through bevel gears 105, 106 to a servo motor 107, which may be of conventional design, adapted for controlled operation by the computerized numerical control unit (CNC unit) 94.

Whereas the standard tool slide assembly provided for machining stations one-four derives both horizontal and vertical tool feed motions from the operation of the vertical threaded shaft 59, driven mechanically from the primary drive motor 17, the threaded shaft 103 of the modified machining station provides only a vertical component of motion. Horizontal or transverse motion is provided by a second servo motor 108, also connected to the CNC control unit 94, which is engaged through bevel gears 109, 110 to a threaded shaft and ball screw assembly 111, 112. The ball screw 112 is secured to a transversely movable tool slide 60a, on which appropriate cutting tools are mounted. In this respect, it will be understood, that in a machining installation as illustrated in this application, where there are dual spindles at each machining location, each of the tool slides 60, 60a, will mount at least two cutting tools for simultaneous operation on the workpiece of each spindle of a pair.

As illustrated in FIGS. 6-8, the servo motor 108, for transverse tool motion, is advantageously mounted directly on the vertically movable tool slide 14a, for up and down movement along with the slide. While it would be possible to mount the motor 108 in fixed position on the feed works platform, and utilize a splined shaft or the like for a movable mechanical connection, it is greatly preferred to movably mount the servo motor 108 and connect it to its drive and control source by means of flexible conductors (not shown). As shown particularly in FIG. 6, the servo motor 108 may advantageously be mounted on the vertical slide 14a with its axis directed generally downward at a slight angle to the axis of the main column 11, so as to be disposed generally within the physical outlines of the vertical slide 14a, enabling the modified slide unit to be received generally within the same space as is provided for a conventional slide unit.

With both of the servo motors 107, 108 being connected to the CNC unit, along with the variable speed spindle drive motor 93, machining operations of much greater complexity may be carried out with the modified "Mult-Au-Matic" type unit. Among other things, the rates of horizontal and vertical tool feed movement may be varied, either together or one with respect to the other, to accomplish rather complex contouring operations. In addition, spindle speed may be varied during the course of the machining operations, as may be appropriate to the diameter being cut at any moment and/or the precise nature of the operation.

Significantly, in the apparatus of the invention, the CNC unit can be programmed to compensate for individual dimensional positioning errors in each of the spindle pairs, as they are progressively brought into the number five or final finishing position. In this respect, a typical "Mult-Au-Matic" type rotary indexing machine may have a worktable diameter on the order of six feet. Working with equipment of such massive size, experience has indicated that there may be minor variations in the positioning of the individual work stations at any given location. This has served in the past to limit machining tolerances to approximately plus or minus 0.0005.

With the equipment of the present invention, however, after the machine is assembled and put into operation, the positional variation of each spindle station at the finish or number five position may be precisely measured, and the coordinates or any variation from intended position can be programmed into the CNC control for each position. Accordingly, when worktable position number one, for example, is indexed into the number five machining position, its previously measured positional variation is known to the CNC unit, and the instructions to the servo motors 107, 108 provide a corresponding offset. Since the positional variation for each worktable position may be slightly different, the CNC unit is preprogrammed separately with respect to each such worktable position and the appropriate offset is automatically introduced at each new index of the rotary worktable.

The system of the invention is further advantageous in permitting multiple pass threading operations to be performed at the finish machining station. Heretofore, using mechanically driven and synchronized feed works units, threading could only be accomplished if done in a single pass, which usually is not practicable. With the system of the present invention, the precise rotary position of the spindle at any time is known to the CNC unit, through its control of the motor 93 in conjunction with a positional feedback sensor (not shown), which may be of conventional and well known type. Thus, the finish machining unit, at the modified station, may be utilized to make several threading passes, if necessary, in each instance commencing the pass at a given rotational position of the work.

The system of the invention significantly extends the usefulness of multiple spindle, rotary indexing machine tool centers, such as the "Mult-Au-Matic" type L Vertical Chucking Machine. The well known and thoroughly tested advantages of such machine may be principally retained while, at the same time, permitting for the first time the manufacture of parts of more complex design, finished to extremely close tolerances (reliably to plus or minus 0.0001), and also permitting threading operations, for example, to be performed. Uniquely, the CNC control machining station is operable in sequence with each of a succession of spindle stations, which have previously been advanced through a plurality of mechanically coordinated machining steps, operating from a single, common drive motor.

Important and unexpected advantages are derived from the association of a CNC controlled machining station with the several mechanically coordinated stations in that, in the highly repetitive, long production run machining of like parts, the bulk of the machining operations may be carried out with relatively lower cost, extremely rugged and reliable, single drive, mechanically coordinated machining stations. Yet without rechucking or otherwise handling the part, selected machining operations may be carried out under CNC control, with appropriate offsets for positional variation in the mechanically indexed worktable, such that certain critical machining operations on the workpieces may be not only performed with great precision, but may include heretofore impractical or impossible machining operations such as complex contouring and threading, for example. With the equipment of the invention, the operational output of the CNC control is significantly greater than if an effort were made to perform the entire machining operation with one or more CNC controlled units. Because these units involve very significant expense, as compared to the mechanically coordinated units, important economic advantages are realized in the modified, combinations machine tool center, in which mechanically coordinated units perform most of the basic machining operations, and CNC units are utilized at one or more stations to perform operations where greater precision is required and/or the mechanical units are incapable of performing the operation.

A variety of CNC controls, which are available commercially, would be suitable for the purposes of the invention. One such control is the Allen Bradley series 7100 computerized numerical control system, as available on the filling hereof from Allen Bradley Company, Cleveland, Ohio.

The concept of the invention, not only enormously enlarges the potential uses of multiple spindle, rotary indexing vertical chucking machines, but also is designed so as to be suitable for retrofit installation in existing machines, enabling those machines to be upgraded significantly to more modern production requirements.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

We claim:

1. A multiple spindle, rotary indexing machine tool having a base, a central column upstanding from said base, a load-unload station, a plurality of machining stations each with a tool slide, a rotary worktable on said base and surrounding said column, work carrying spindles on said worktable at spaced work positions, and means for indexing said worktable to advance said work carrying spindles successively from the load-unload station through each of the machining stations in sequence and back to the load-unload station, characterized by (a) a single primary drive motor,
  (b) controllably engageable spindle drive mechanisms in said base at each of the machining stations,
  (c) first sets of independent, changeable gear mechanisms for connecting said primary drive motor to the spindle drive mechanisms at each machining station except the final finish machining station,
  (d) second sets of independent, changeable gear mechanisms for connecting said primary drive motor to each of the tool slides at the several machining stations having gear-connected spindle drives, (e) independent X and Y axis positioning motors connected for moving the tool slide at said final machining station, (f) an independent spindle drive motor connected for moving the spindle at said final machining station, and (g) a CNC control unit coordinating the operations of said positioning motors and of said independent spindle drive motor.

2. A machine tool according to claim 1, further characterized by (a) a feed works platform mounted on said column and carrying independently settable feed works for each of the gear-connected tool slides and the spindles drives associated therewith, (b) one of said positioning motors being mounted on said feed works platform and being connected to a vertically movable slide at said one final finish machining station, (c) the other of said positioning motors being mounted on said vertically movable slide and being connected to a horizontally movable slide carried by said vertically movable slide.

3. A multiple spindle, rotary indexing machine tool having a base, a central column upstanding from said base, a load-unload station, a plurality of matching stations each with a tool slide, a rotary worktable on said base and surrounding said column, work carrying spindles on said worktable at spaced work positions, and means for indexing said worktable to advance said work carrying spindles successively from the load-unload station through each of the machining stations in sequence and back to the load-unload station, characterized by (a) a single primary drive motor, (b) a controllably engageable spindle drive mechanism associated with each machining station for engagement with and driving of spindles indexed with said worktable to such machining stations, (c) independent feed works mechanisms for at least certain of said machining stations for connecting the spindle drive mechanisms at said certain stations to said primary drive motor, (d) means including said feed works mechanisms for connecting the tool slides at said certain machining stations to said primary drive motor, (e) indexing means for periodically connecting said worktable to said primary drive motor for incrementally rotatably advancing said worktable, (f) at least the one machining station next preceding the load-unload station having a spindle drive mechanism independent of said primary drive motor, (g) a separate, variable speed motor for said last mentioned spindle drive mechanism, (h) independent X and Y axis positioning motors for the tool slides at said last mentioned machining station, and (i) programmable computerized control means for coordinately operating said positioning motors and said variable speed motor.

4. A machine tool according to claim 3, further characterized by (a) said feed works mechanisms being provided for all machining stations except the one next preceding the load-unload station.

5. A machine tool according to claim 4, further characterized by (a) said computerized control means including means cooperable with each index position of said worktable for effecting dimensional offsets to compensate for positional variation of work holding spindles at the several index positions when aligned at the machining station next preceding said load-unload station.

* * * * *